US012766413B2

(12) United States Patent
Tang

(10) Patent No.: US 12,766,413 B2
(45) Date of Patent: Oct. 20, 2026

(54) INFORMATION PROCESSING IN ASYMMETRIC COMPETITIVE GAMES

(71) Applicant: NETEASE (HANGZHOU) NETWORK CO., LTD., Hangzhou (CN)

(72) Inventor: Yudi Tang, Hangzhou (CN)

(73) Assignee: NETEASE (HANGZHOU) NETWORK CO., LTD., Hangzhou (CN)

(*) Notice: Subject to any disclaimer, the term of this patent is extended or adjusted under 35 U.S.C. 154(b) by 131 days.

(21) Appl. No.: 18/995,058

(22) PCT Filed: Nov. 1, 2022

(86) PCT No.: PCT/CN2022/128975
§ 371 (c)(1),
(2) Date: Jan. 15, 2025

(87) PCT Pub. No.: WO2024/011785
PCT Pub. Date: Jan. 18, 2024

(65) Prior Publication Data

US 2026/0014466 A1 Jan. 15, 2026

(30) Foreign Application Priority Data

Jul. 15, 2022 (CN) ........................ 202210837798.X

(51) Int. Cl.
*A63F 13/53* (2014.01)
*A63F 13/5372* (2014.01)
(Continued)

(52) U.S. Cl.
CPC ...... *A63F 13/5372* (2014.09); *A63F 13/5378* (2014.09); *G06F 3/04847* (2013.01); *G06F 3/0488* (2013.01)

(58) Field of Classification Search
CPC .............. A63F 13/5372; A63F 13/5378; A63F 13/2145; A63F 13/822; G06F 3/0481; G06F 3/0847; G06F 3/0488
See application file for complete search history.

(56) References Cited

U.S. PATENT DOCUMENTS 11,298,617 B2 * 4/2022 Kuriyama ............... A63F 13/45
11,376,501 B2 * 7/2022 Fan ....................... A63F 13/837
(Continued)

FOREIGN PATENT DOCUMENTS

CN 113209616 A 8/2021
CN 113244603 A 8/2021
(Continued)

OTHER PUBLICATIONS

International Search Report and Written Opinion for PCT Application No. PCT/CN2022/128975 dated Apr. 10, 2023.

*Primary Examiner* — Omkar A Deodhar
(74) *Attorney, Agent, or Firm* — Patterson + Sheridan, LLP

(57) ABSTRACT

The present disclosure provides a method for processing information. The method includes: according to a preset marking condition, determining a first target character from a virtual character set; tagging the first target character with a virtual tag of a first virtual character, and controlling the virtual tag to be displayed in a graphical user interface of the first virtual character with a first display parameter; and in response to a first touch operation, adjusting the first display parameter to a second display parameter, and controlling the virtual tag to be displayed in the graphical user interface of the first virtual character with the second display parameter, where a visibility of the virtual tag displayed with the second display parameter is higher than a visibility of the virtual tag displayed with the first display parameter.

20 Claims, 3 Drawing Sheets

(51) Int. Cl.

| | |
|---|---|
| ***A63F 13/5378*** | (2014.01) |
| ***G06F 3/04847*** | (2022.01) |
| ***G06F 3/0488*** | (2022.01) |

(56) References Cited

U.S. PATENT DOCUMENTS

| | | | | |
|---|---|---|---|---|
| 11,478,696 | B2 * | 10/2022 | Wang | G06F 3/04845 |
| 2018/0043260 | A1 * | 2/2018 | Tang | A63F 13/822 |
| 2019/0094981 | A1 * | 3/2019 | Bradski | G06V 40/168 |
| 2020/0338449 | A1 * | 10/2020 | Fan | A63F 13/537 |
| 2020/0368616 | A1 * | 11/2020 | Delamont | A63F 13/21 |
| 2022/0054945 | A1 | 2/2022 | Salik | |
| 2022/0266141 | A1 * | 8/2022 | Liu | A63F 13/537 |
| 2022/0266142 | A1 * | 8/2022 | Liu | A63F 13/2145 |
| 2024/0286032 | A1 * | 8/2024 | Li | G06F 3/04883 |
| 2026/0014466 | A1 * | 1/2026 | Tang | A63F 13/5372 |

FOREIGN PATENT DOCUMENTS

| | | | |
|---|---|---|---|
| CN | 114344893 | A | 4/2022 |
| CN | 115185412 | A | 10/2022 |
| WO | 2022128975 | A1 | 6/2022 |
| WO | 2024011785 | A1 | 1/2024 |

* cited by examiner

INFORMATION PROCESSING IN ASYMMETRIC COMPETITIVE GAMES

CROSS-REFERENCE TO RELATED APPLICATION

The present disclosure is a 371 national phase application of PCT Application No. PCT/CN2022/128975 filed 11 Nov. 2022, which claims priority to Chinese Patent Application No. 202210837798.X filed with the China National Intellectual Property Administration on 15 Jul. 2022 and titled "METHOD FOR INFORMATION PROCESSING, APPARATUS FOR INFORMATION PROCESSING, ELECTRONIC DEVICE, AND READABLE STORAGE MEDIUM", the entire contents of both of which applications are hereby incorporated by reference for all purposes.

TECHNICAL FIELD

The present disclosure relates to the technical field of games, and particularly relates to a method for information processing, an apparatus for information processing, an electronic device, and a readable storage medium.

BACKGROUND

With the gradual increase of game types, asymmetric competitive games have gradually come into the public's awareness. In such a game, players belong to different game camps. For example, the players may belong to an offensive camp and a defensive camp respectively. The number of virtual characters in the offensive camp is different from the number of virtual characters in the defensive camp. The virtual characters in the offensive camp are disguised to complete game tasks in a virtual scenario, and need to evade tracking by the virtual characters in the defensive camp in the process of completing the game tasks.

In order to accurately implement continuous tracking of the virtual characters in the offensive camp, the virtual characters in the defensive camp need to determine moving directions of the virtual characters in the offensive camp by tagging the virtual characters in the offensive camp. Therefore, during the game, in order to facilitate finding the virtual characters in the offensive camp by the virtual characters in the defensive camp in the virtual scenario, virtual tags will be displayed in the virtual scenario for a long time, while the virtual tags will always be displayed in regions that cannot be observed by the virtual characters in the defensive camp, thereby imperceptibly increasing data processing load of a terminal device, and increasing response frequency of the terminal device.

SUMMARY

Embodiments of the present disclosure provides a method, system, and apparatus for information processing that control timing for displaying a virtual tag. The disclosed approach optimizes virtual tag display (e.g., by avoiding display when not needed), thereby alleviating data processing burden on a terminal device and reducing the response frequency of the terminal device.

According to a first aspect, the present disclosure provides a method for information processing. The method for information processing includes: determining a first target character from a virtual character set based on a preset tag condition, where the virtual character set includes a second virtual character and a non-player virtual character, and a graphical user interface provided by a terminal device includes a virtual scenario of a virtual battle, a first virtual character in a first camp, the second virtual character in a second camp different from the first camp, and the non-player virtual character, the first virtual character corresponding to the terminal device; tagging the first target character with a virtual tag of the first virtual character, and controlling the virtual tag to be displayed on the graphical user interface of the first virtual character with a first display parameter; and adjusting, in response to a first touch operation, the first display parameter to a second display parameter, and controlling the virtual tag to be displayed on the graphical user interface of the first virtual character with the second display parameter, where a visibility of the virtual tag displayed on the graphical user interface of the first virtual character with the second display parameter is higher than a visibility of the virtual tag displayed on the graphical user interface of the first virtual character with the first display parameter.

According to a second aspect, the present disclosure provides a system, comprising one or more memories collectively containing one or more programs, and one or more processors, where the one or more processors are configured to, individually or collectively, perform the operations described in the above method for information processing.

According to a third aspect, the present disclosure further provides one or more non-transitory computer-readable storage media containing, in any combination, computer program code that, when executed by a computer system, performs the operations described in the above method for information processing.

BRIEF DESCRIPTION OF THE DRAWINGS

To more clearly describe the technical solutions of the embodiments of the present disclosure, the drawings to be used in the embodiments will be briefly introduced below, and it should be understood that the following drawings only show some embodiments of the present disclosure, and therefore should not be viewed as limiting the scope of the present disclosure. For those of ordinary skills in the art, other relevant drawings may also be obtained based on these drawings without creative work.

DETAILED DESCRIPTION

Figure 1:
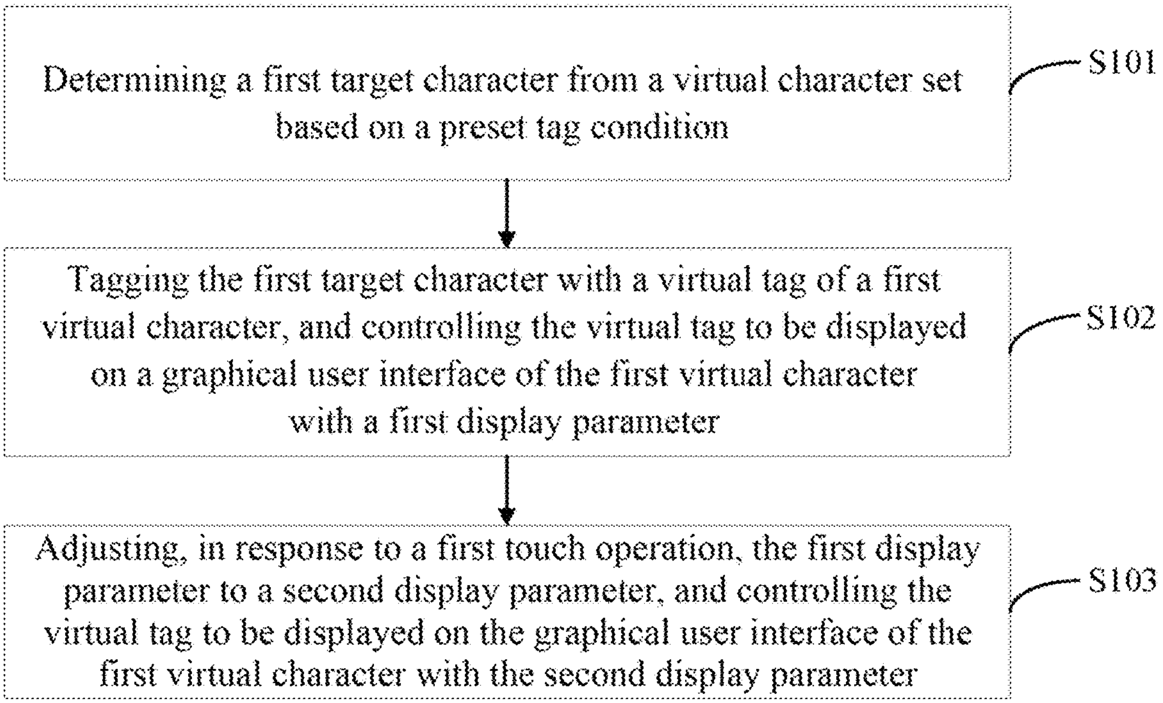
FIG. 1 is a flowchart of a method for information processing provided in an embodiment of the present disclosure.

In order to make the objectives, technical solutions, and advantages of embodiments of the present disclosure clearer, the technical solutions in the embodiments of the present disclosure will be clearly and completely described below with reference to the drawings in the embodiments of the present disclosure. Apparently, the described embodiments are merely some, instead of all, of the embodiments of the present disclosure. Generally, components of the embodiments of the present disclosure described and illustrated in the figures herein may be arranged and designed in a variety of different configurations. Therefore, the following detailed description of the embodiments of the present disclosure provided in the drawings is not intended to limit the scope of the present disclosure, but merely represents selected embodiments of the present disclosure. Each of other embodiments obtained by those skilled in the art based on the embodiments of the present disclosure without creative work is encompassed within the scope of protection of the present disclosure.

Virtual Scenario

It is a virtual scenario displayed (or provided) when an application program is running on a terminal or a server. In some embodiments, the virtual scenario is a simulation environment of the real world, or is a partially simulated and partially frictional virtual environment, or is a purely fictional virtual environment. The virtual scenario is any one of a two-dimensional virtual scenario and a three-dimensional virtual scenario. The virtual environment may be, e.g., the sky, land, or ocean, where the land includes an environmental element, such as a desert or a city. The virtual scenario is a scenario with complete game logic of a virtual object such as user control.

Virtual Character

It refers to a dynamic object controllable in the virtual scenario. In some embodiments, the dynamic object may be, e.g., a virtual character, a virtual animal, or an animated character. The virtual character is a character controlled by a player through an input device, or is Artificial Intelligence (AI) provided in a battle of a virtual environment by training, or is a Non-Player Character (NPC) provided in a battle of a virtual scenario. In some embodiments, the virtual character is a virtual character competing in the virtual scenario. In some embodiments, the number of virtual characters in the battle of the virtual scenario is preset, or is dynamically determined based on the number of clients joining the battle, which is not limited in the embodiments of the present disclosure. In a possible implementation, a user can control the virtual character to move in the virtual scenario, for example, control the virtual character to, e.g., run, jump, or crawl, and can also control the virtual character to fight with other virtual characters using skills, virtual props, etc. provided by the application program.

Player Character

It refers to a virtual character that can be controlled by a player to move in a game environment, and may also be called a shikigami character or a hero character in some electronic games. The player character may be at least one of different forms, such as a virtual character, a virtual animal, an animated character, and a virtual vehicle.

Game Interface

It refers to an interface corresponding to an application program provided or displayed through a graphical user interface, and includes a UI interface for interaction between players and a game picture. In some embodiments, the UI interface may include a game widget (such as a skill widget, a movement widget, or a functional widget), an indicator identifier (such as a direction indicator identifier and a character indicator identifier), an information display region (such as a kill count and a game duration), or a game setting widget (such as system settings, stores, or gold coins). In some embodiments, the game picture is a display picture corresponding to a virtual scenario displayed on a terminal device, and the game picture may include a virtual character, such as a game character, a NPC character, and an AI character, that executes game logic in the virtual scenario.

The method for information processing in one embodiment of the present disclosure may run on a terminal device or a server. The terminal device may be a local terminal device. When the method for information processing runs on the server, the method for information processing may be implemented and executed based on a cloud interaction system, wherein the cloud interaction system includes a server and a client device.

In some embodiments, various cloud applications, such as cloud gaming, may be run under the cloud interaction system. Taking the cloud game as an example, the cloud game refers to a game method based on cloud computing. In an operating mode of the cloud game, an entity for operating a game program and an entity for presenting the game picture are separated. The storage and operation of the method for information processing are completed on a cloud game server. The client device functions to receive data, transmit data, and present the game picture. For example, the client device may be a display device with data transmission function in the vicinity of the user side, such as a mobile terminal, a television set, a computer, or a palm computer. However, the terminal device performing information processing is a cloud game server in cloud. When playing a game, the player operates the client device to transmit an operating instruction to the cloud game server. The cloud game server runs the game based on the operating instruction, encodes and compresses data such as the game picture, returns the data to the client device through a network, and finally decodes the data and outputs the game picture through the client device.

In some embodiments, the terminal device can be a local terminal device. Taking a game as an example, the local terminal device stores the game program and is configured to present the game picture. The local terminal device is configured to interact with the player through a graphical user interface, namely, the game program is downloaded, installed and operated through an electronic device conventionally. The local terminal device provides the graphical user interface for the player in various modes, for example, it can be rendered and displayed on a display screen of a terminal, or it is provided for the player through holographic projection. For example, the local terminal device may include a display screen and a processor. The display screen is configured to present the graphical user interface. The graphical user interface includes the game picture. The processor is configured to run the game, generate the graphical user interface, and control display of the graphical user interface on the display screen.

An embodiment of the present disclosure provides an implementation environment, which may include: a first terminal device, a game server, and a second terminal device. The first terminal device and the second terminal device communicate with the server respectively, to implement data communication. In this embodiment, the first terminal device and the second terminal device are each installed with a client that implements the method for displaying a game process provided in the present disclosure, and the game server is a server that implements the method for displaying a game process provided in the present disclosure. Through the client, the first terminal device and the second terminal device can communicate with the game server respectively.

Taking the first terminal device as an example, the first terminal device establishes communication with the game server by running the client. In some embodiments, the server establishes a game round based on a game request from the client. Parameters of the game round may be determined based on parameters in the received game request. For example, the parameters of the game round may include the number of parties involved in the game round, and levels of characters involved in the game round, etc. When the first terminal device receives a response from the server, a virtual scenario corresponding to the game round is displayed through a graphical user interface of the first terminal device. In some embodiments, the server determines a target game round for the client from a plurality of established game rounds based on the game request from the client. When the first terminal device receives the response from the server, the virtual scenario corresponding to the game round is displayed through the graphical user interface of the first terminal device. The first terminal device is a device controlled by a first user. A virtual object displayed on the graphical user interface of the first terminal device is a player character controlled by the first user. The first user inputs an operating instruction through the graphical user interface to control the player character to perform a corresponding operation in the virtual scenario.

Taking the second terminal device as an example, the second terminal device establishes communication with the game server by running the client. In some embodiments, the server establishes a game round based on a game request from the client. Parameters of the game round may be determined based on parameters in the received game request. For example, the parameters of the game round may include the number of parties involved in the game round, and levels of characters involved in the game round, etc. When the second terminal device receives a response from the server, a virtual scenario corresponding to the game round is displayed through a graphical user interface of the second terminal device. In some embodiments, the server determines a target game round for the client from the plurality of established game rounds based on the game request from the client. When the second terminal device receives the response from the server, the virtual scenario corresponding to the game round is displayed through the graphical user interface of the second terminal device. The second terminal device is a device controlled by a second user. A virtual object displayed on the graphical user interface of the second terminal device is a player character controlled by the second user. The second user inputs an operating instruction through the graphical user interface to control the player character to perform a corresponding operation in the virtual scenario.

The server performs data calculation based on game data reported by the first terminal device and the second terminal device, and synchronizes the calculated game data to the first terminal device and the second terminal device, so that the first terminal device and the second terminal device control rendering of the corresponding virtual scenario and/or virtual object on the graphical user interface based on the synchronization data transmitted from the server.

In this embodiment, the virtual character controlled by the first terminal device and the virtual character controlled by the second terminal device are virtual characters in a same game round. The virtual character controlled by the first terminal device and the virtual character controlled by the second terminal device may have a same character attribute, or may have different character attributes.

It should be noted that virtual characters in a current game round may include two or more than two virtual characters, and different virtual characters may correspond to different terminal devices respectively. Therefore, in the current game round, more than two terminal devices perform game data transmission and synchronization with the game server respectively.

As found through researches, in order to accurately implement continuous tracking of virtual characters in an offensive camp, virtual characters in a defensive camp need to determine moving directions of the virtual characters in the offensive camp by tagging the virtual characters in the offensive camp. Therefore, during a game, in order to facilitate finding the virtual characters in the offensive camp by the virtual characters in the defensive camp in the virtual scenario, virtual tags will be displayed in the virtual scenario for a long time, while the virtual tags will always be displayed in regions that cannot be observed by the virtual characters in the defensive camp, thereby imperceptibly increasing data processing load of the terminal device, and increasing response frequency of the terminal device.

In view of this, the present disclosure provides a method, system, and apparatus for information processing that control timing for displaying a virtual tag. The disclosed approach optimizes virtual tag display (e.g., by avoiding displaying display when not needed), thereby alleviating data processing burden on a terminal device and reducing the response frequency of the terminal device.

Terms used in the present disclosure are merely for describing specific examples and are not intended to limit the present disclosure. The singular forms "one", "the", and "this" used in the present disclosure and the appended claims are also intended to include a multiple form, unless other meanings are clearly represented in the context. It should also be understood that the term "and/or" used in the present disclosure refers to any or all of possible combinations including one or more associated listed items.

Reference throughout this specification to "one embodiment," "an embodiment," "an example," "some embodiments," "some examples," or similar language means that a particular feature, structure, or characteristic described is included in at least one embodiment or example. Features, structures, elements, or characteristics described in connection with one or some embodiments are also applicable to other embodiments, unless expressly specified otherwise.

It should be understood that although terms "first", "second", "third", and the like are used in the present disclosure to describe various information, the information is not limited to the terms. These terms are merely used to differentiate information of a same type. For example, without departing from the scope of the present disclosure, first information is also referred to as second information, and similarly the second information is also referred to as the first information. Depending on the context, for example, the term "if" used herein may be explained as "when" or "while", or "in response to . . . , it is determined that".

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

Referring to FIG. 1, FIG. 1 is a flowchart of a method for information processing provided in an embodiment of the present disclosure. A graphical user interface is provided a through a terminal device, the graphical user interface includes a virtual scenario of a virtual battle, a first virtual character in a first camp, at least one second virtual character in a second camp different from the first camp, and at least one non-player virtual character, where the first virtual character corresponds to the terminal device; and as shown in FIG. 1, the method for information processing includes:

S101: determining a first target character from a virtual character set based on a preset tag condition.

S102: tagging the first target character with a virtual tag of the first virtual character, and controlling the virtual tag to be displayed on the graphical user interface of the first virtual character with a first display parameter.

S103: adjusting, in response to a first touch operation, the first display parameter to a second display parameter, and controlling the virtual tag to be displayed on the graphical user interface of the first virtual character with the second display parameter.

A method for information processing provided in an embodiment of the present disclosure determines a to-be-tagged first target character from a virtual character set including at least one second virtual character and at least one non-player character based on a preset tag condition, tags the first target character with a virtual tag of a first virtual character, displays the virtual tag on a graphical user interface of the first virtual character based on a first display parameter; adjusts, in response to a first touch operation, the first display parameter to a second display parameter, and displays the virtual tag on the graphical user interface of the first virtual character based on a second display parameter; where the virtual tag displayed on the graphical user interface of the first virtual character based on the second display parameter has a higher visibility than the virtual tag displayed on the graphical user interface of the first virtual character based on the first display parameter. In this way, timing for displaying the virtual tag can be controlled, to avoid displaying the virtual tag in an embodiment where display is not needed, thereby further alleviating data processing burden on a terminal device, and reducing response frequency of the terminal device.

The above example steps provided in the embodiments of the present disclosure will be described below when the above method is applied to, e.g., a terminal device.

In an asymmetric competitive game, a first player needs to control the first virtual character to find a second virtual character controlled by a second player in the second camp different from the first camp in the virtual scenario, and attack the second virtual character to win the game. However, there are a large number of non-player virtual characters in the virtual scenario, and in the asymmetric competitive game, the first virtual character does not need to attack the non-player virtual characters to win the game. Therefore, in such a game, the first virtual character needs to track the first target character based on the virtual tag tagging the first target character during the game.

In the step S101, in order to ensure seamless operation of the game, the to-be-tagged first target character may be determined from the virtual character set based on the preset tag condition.

The virtual character set includes the at least one second virtual character and the at least one non-player virtual character; therefore, the second virtual character in the second camp different from the first camp to which the first virtual character belongs may be determined as the first target character; or the non-player virtual character in the virtual scenario may be determined as the first target character.

Here, in order to increase the diversity of target tagging selections during the game, the first target character may be determined in different modes in an actual game.

In an embodiment, the step S101 includes: randomly determining, in response to start of the virtual battle, the first target character from the virtual character set.

In this step, in response to the start of the virtual battle, such as when the first virtual character and the second virtual character enter the virtual scenario involved in the virtual battle, the first target character to be tagged with the virtual tag is determined through random selection from the virtual character set including the at least one second virtual character and/or the at least one non-player virtual character.

And/or, in response to the start of the virtual battle, the first target character is determined from the virtual character set based on a character type of each second virtual character.

In this step, in response to the start of the virtual battle, the character type of each second virtual character is determined. For example, the second virtual character may be a strongly offensive type, a detection type, a stealthy type, a strategic type, etc. In this way, the character type of each second virtual character may be used to determine, for a character type thereof, the second virtual character belonging to the character type as the first target character.

In some embodiments, there will be a plurality of second virtual characters of a same character type. In this embodiment, any one second virtual character among the plurality of second virtual characters of the same character type may be determined as the first target character.

As an example, the first player controlling the first virtual character chooses to tag the “stealthy” second virtual character prior to the start of the virtual battle. Then, at the start of this virtual battle, the “stealthy” second virtual character among the at least one second virtual character will be tagged. If a plurality of the “stealthy” second virtual characters are present among the at least one second virtual character, one of the “stealthy” second virtual characters may be randomly tagged; and if no “stealthy” second virtual character is present among the at least one second virtual character, a second virtual character of another character type is randomly tagged.

And/or, in response to the start of the virtual battle, the first target character is determined from the virtual character set based on a relative distance between a spawn position of each second virtual character and a spawn position of the first virtual character.

In this step, at the start of the virtual battle, the first virtual character and the second virtual character have different spawn positions respectively. Therefore, the to-be-tagged first target object may be determined at the start of the virtual battle further with reference to the spawn positions of the first virtual character and the second virtual character. Specifically, the relative distance between the spawn position of each second virtual character and the spawn position of the first virtual character is determined, and a second virtual character with a shortest relative distance from the first virtual character is determined as the first target character, which represents that the second virtual character closest to the first virtual character is determined as the first target character.

And/or, during the virtual battle, a virtual character satisfying a condition for being tagged in the virtual character set is determined as the first target character.

In this step, during the virtual battle, when the virtual character satisfying the condition for being tagged is present in the virtual character set, it means that for the first virtual character at a current moment, the virtual character satisfying the condition for being tagged should be tracked. In this embodiment, the virtual character satisfying the condition for being tagged in the virtual character set may be determined as the first target character.

Generally, during the virtual battle, a completion degree of a virtual character on a game task can indirectly indicate gaming capability of the second virtual character in the game. Therefore, the higher the game completion degree of a second virtual character is, the stronger the gaming capability of the second virtual character is in the game; and vice versa, the lower the game completion degree of a second virtual character is, the weaker the gaming capability of the second virtual character is in the game, so that it is more meaningful for the first virtual character to track a target character with a strong gaming capability. Therefore, during this virtual battle, compared to other second virtual characters, a second virtual character with a highest game task completion degree should be more worthy of being tracked by the first virtual character.

In an embodiment, the condition for being tagged includes: a highest game task completion degree in the virtual battle.

During the virtual battle, the game task completion degree of each virtual character in the virtual character set is monitored in real time. When a virtual character with the highest game task completion degree is present, it means that the virtual character with the highest game task completion degree has stronger gaming capability. It is more meaningful for the first virtual character to track the virtual character with the highest game task completion degree. Therefore, the virtual character with the highest game task completion degree may be determined as the first target character.

In the step S102, after the to-be-tagged first target character is determined, the first target character can be tagged with the virtual tag of the first virtual character; and the virtual tag is controlled to be displayed on the graphical user interface of the first virtual character based on the first display parameter.

The virtual tag is controlled to be displayed on the graphical user interface of the first virtual character based on the first display parameter, specifically including displaying the virtual tag on the graphical user interface of the first virtual character in a state invisible to the first virtual character; and further including displaying the virtual tag on the graphical user interface of the first virtual character in a state with a low visibility to the first virtual character, which may be adjusted based on actual situation.

Here, the virtual tag is a special tag displayable in the virtual scenario. The first virtual character determines a moving direction of the first target character by observing the virtual tag displayed in the virtual scenario, and then tracks the first target character. The virtual tag may be displayed in any form, for example, may be any tag sign (for example, an exclamation point) or a virtual object (for example, smog or aureole).

The first target character may be the second virtual character in a different camp from the first virtual character, which represents that the second virtual character is an opponent virtual character of the first virtual character; or the first target character may be the non-player virtual character in the game.

Here, when the first target character is the second virtual character, the virtual tag always surrounds the first target character. In this configuration, the virtual tag tagging the first target character will not gradually diminishes over time, until life state of the first target character becomes a death state, the tagging of the first target character will be terminated.

When the first target character is the non-player virtual character, the virtual tag may surround the first target character in a form of gradually diminishing within a predetermined display time. In this configuration, the virtual tag surrounding the non-player virtual character within the predetermined display time gradually diminishes over time, until the virtual tag becomes invisible completely.

When the first target character is tagged with the virtual tag, the first target character can interact with other virtual characters in the virtual scenario in a survival state, and may tag with a virtual tag carried therewith a second target character satisfying an interaction condition with the first target character. In this configuration, the first target character is configured to tag the second target character with its own tag (e.g., the virtual tag of the first target character), provided that the second target character satisfies the interaction condition with the first target character; thereby spreading the virtual tag in the virtual scenario of the game.

The interaction condition may include contacting or fighting with the first target character, which represents that, when the second target character comes into contact with the first target character, the second target character can be tagged.

Here, the display state of the virtual tag in the virtual scenario relative to the first virtual character may be roughly classified into two types; the first type is that when the first virtual character does not release a skill of detecting the virtual tag, the display state of the virtual tag in the virtual scenario relative to the first virtual character is set to the state invisible to the first virtual character;

the second type is that when the first virtual character releases the skill of detecting the virtual tag, a display parameter for controlling the display of the virtual tag may be changed to set the display state of the virtual tag in the virtual scenario relative to the first virtual character to the state visible to the first virtual character. In this configuration, when the first virtual character releases the skill of detecting the virtual tag, the first virtual character can observe the virtual tag in the virtual scenario, thereby assisting the first virtual character to track the first target character based on the displayed virtual tag.

In the step S103, in response to the first touch operation, the display parameter change of the virtual tag is triggered to adjust the first display parameter originally used to display the virtual tag to the second display parameter; and the virtual tag is controlled to be displayed on the graphical user interface of the first virtual character based on the obtained second display parameter, specifically including displaying the virtual tag on the graphical user interface of the first virtual character in a state clearly visible to the first virtual character.

In the solutions provided in the present disclosure, in response to the first touch operation, the first display parameter is adjusted to the second display parameter, which may specifically be that, the first player can, when pressing a widget corresponding to the first touch operation, adjust the first display parameter to the second display parameter; where the first player can transmit a trigger instruction of the first touch operation through the widget and\or a preset combination key; or a preset combination key in a game controller, such as "L1" key or "R1" key in a game pad. Specifically, the first player can touch a key with his finger, mouse, etc.; or through a preset combination key in a keyboard, for example, a key, such as "ctrl" key, "alt" key, or "a" key in the keyboard. The preset keys may be manually set based on requirements of the first player.

In an embodiment, the adjusting, in response to the first touch operation, the first display parameter to the second display parameter, and controlling the virtual tag to be displayed on the graphical user interface of the first virtual character with the second display parameter includes:

Step 1: controlling, in response to the first touch operation, the first virtual character to release a first skill, and determining a skill release range and a skill effect duration of the first skill on the graphical user interface of the first virtual character.

In this step, in response to the first touch operation exerted by the first player on a skill release widget, the first virtual character is controlled to release the first skill in the virtual scenario, and the skill release range of the first skill having an effect in the virtual scenario and the skill effect duration of the first skill having an effect in the virtual battle are determined.

Step 2: adjusting, within the skill effect duration, the first display parameter to the second display parameter, and controlling the virtual tag to be displayed with the second display parameter within the skill release range.

In this step, within the skill effect duration of the first skill, the first display parameter originally used to display the virtual tag is adjusted to the second display parameter, and within the skill release range of the first skill, the virtual tag is displayed with the second display parameter. In this configuration, the first virtual character can observe the virtual tag present within the skill release range of the first skill during the skill effect duration of the first skill.

In the game, the first virtual character can determine its own position using a minimap displayed on the graphical user interface, and in some embodiments, for example, when the second virtual character in an opponent state to the first virtual character performs a game task, a region where the second virtual character is located may also be roughly displayed. In this embodiment, the first virtual character can determine the region where the second virtual character is located using the minimap displayed on the graphical user interface.

In an embodiment, the minimap is displayed on the graphical user interface; and the method for information processing further includes: controlling a first region and/or a second region in the minimap to be displayed with a third display parameter on the graphical user interface of the first virtual character, while controlling the first virtual character to release the first skill; and In this step, the first region and/or the second region in the minimap are/is displayed with the third display parameter on the graphical user interface of the first virtual character, while the first virtual character releases the first skill; which may specifically include displaying the first region and/or the second region on the graphical user interface of the first virtual character in the state invisible to the first virtual character. In this configuration, for the first virtual character, it is impossible to distinguish the first region and/or the second region in the minimap.

Here, the first region refers to a fuzzy exposed region in the game where the second virtual character may be present; and the second region refers to a precise exposed region of the second virtual character in the game.

In some embodiments, the first region and/or the second region in the minimap is controlled to be displayed with a fourth display parameter on the graphical user interface of the first virtual character while controlling the first virtual character to release the first skill.

In this step, the first region and/or the second region in the minimap are/is displayed with the fourth display parameter on the graphical user interface of the first virtual character while the first virtual character releases the first skill; which may specifically include displaying the first region and/or the second region on the graphical user interface of the first virtual character in a state clearly visible to the first virtual character. In this configuration, the first virtual character still can distinguish the first region and/or the second region in the minimap.

Here, the first region refers to a fuzzy exposed region in the game where the second virtual character may be present; and the second region refers to a precise exposed region where the second virtual character is currently located in the game.

A visibility of the first region and/or the second region displayed in the minimap of the graphical user interface of the first virtual character with the fourth display parameter is higher than a visibility of the first region and/or the second region displayed in the minimap of the graphical user interface of the first virtual character with the third display parameter.

During the virtual battle, for the first virtual character, the key to winning the game is to prevent a game camp to which the second virtual character belongs from successfully completing all game tasks. Then, for the first virtual character, the target character worthy of tracking is not fixed under different virtual battle progresses, and needs to change based on actual situation of the virtual battle.

In an embodiment, the graphical user interface includes a character identifier corresponding to the second virtual character, and after the step of the tagging the first target character with the virtual tag of the first virtual character, the method for information processing further includes: controlling to display tag information representing that the first target character has been tagged at a character identifier corresponding to the first target character in the second virtual character.

In this step, the graphical user interface includes a character identifier corresponding to the second virtual character. In order to facilitate finding the first target character in the virtual scenario by the first virtual character, after the first target character is tagged with the virtual tag of the first virtual character, the tag information representing that the first target character has been tagged is displayed at the character identifier corresponding to the first target character in the second virtual character displayed on the graphical user interface. Specifically, the graphical user interface may display the character identifier of the first target character (for example, character avatar), and the tag information (for example, a specially preset tag identifier) tagging the first target character is displayed around the character identifier. Here, the tag information representing that the first target character is tagged does not overlap with display position of other tag information, which represents that the tag information representing that the first target character is tagged will not be blocked by other tag information, thereby avoiding the first player controlling the first virtual character being unable to clearly understand the tag situation in the virtual battle.

Figure 2:
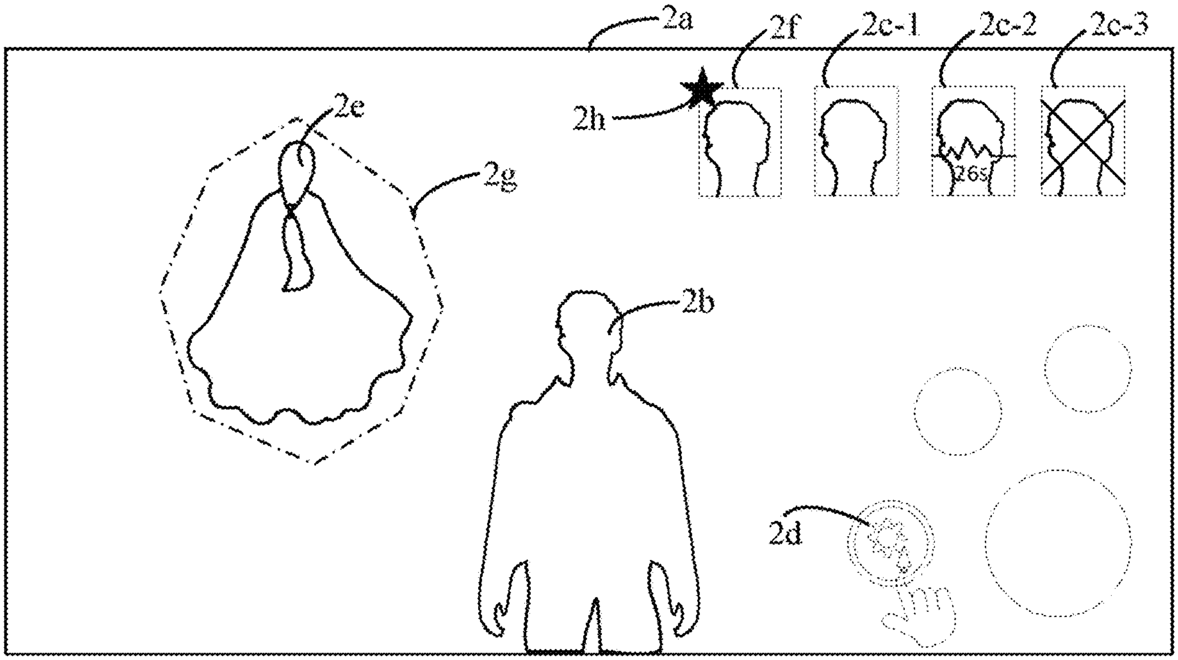
FIG. 2 is a first schematic diagram of a graphical user interface provided in an embodiment of the present disclosure.

Referring to FIG. 2, FIG. 2 is a first schematic diagram of a graphical user interface provided in an embodiment of the present disclosure. As shown in FIG. 2, the graphical user interface 2*a* displays a first virtual character 2*b*, a character identifier 2*c*-1 of a second virtual character to a character identifier 2*c*-3 of the second virtual character, a skill widget 2*d* of a first skill, a first target character 2*e*, and a character identifier 2*f* of the first target character 2*e*. In response to a first touch operation exerted by a first player on the skill widget 2*d*, a virtual tag 2*g* in a virtual scenario is displayed on the graphical user interface 2*a* of the first virtual character based on a second display parameter, so that in this embodiment, the virtual tag 2*g* is in a visible state relative to the first virtual character. In this embodiment, the virtual tag 2*g* is displayed around the first target character 2*e* on the graphical user interface 2*a* of the first virtual character. Because the first target character 2*e* is in a process of being tagged, in this embodiment, a tag identifier 2*h* representing that the first target character 2*e* has been tagged can be displayed around the character identifier 2*f* of the first target character 2*e*.

In an embodiment, the method for information processing further includes: controlling the first virtual character to acquire the virtual tag, and updating a virtual attribute value of the first virtual character based on the acquired virtual tag; and controlling, in response to a second touch operation when the virtual attribute value reaches a preset threshold, the first virtual character to perform a corresponding game behavior.

In this step, in the process of controlling the first virtual character to track the first target character in the virtual scenario based on the virtual tag, the first player acquires the virtual tag carried by the first target character and/or the virtual tag carried by the second target character, and updates the virtual attribute value of the first virtual character based on the acquired virtual tag.

The virtual attribute value may include game-related parameter values, such as a life value, an attack power value, and an anger value, of the first virtual character. Here, the anger value is a parameter value required by the first virtual character to change its own form. As an example, when the anger value reaches the preset threshold, the first player can trigger change of the form of the first virtual character, so that the first virtual character can obtain better attack effects, thereby reducing the time required to kill other characters by the first virtual character, further accelerating the game process, and shortening the time consumption required for a game.

In response to the second touch operation exerted by the first player when the first virtual character enables its own virtual attribute value to reach the preset threshold by acquiring the virtual tag, the first virtual character is controlled to perform the corresponding game behavior.

Here, the game behavior refers to a game behavior of the first virtual character that can be present in the game, such as attacking the first target character, changing its own form, or attacking using a game skill.

In an embodiment, the updating the virtual attribute value of the first virtual character based on the acquired virtual tag includes: determining a current attribute value of the virtual tag based on a current freshness attribute of the virtual tag; and updating the virtual attribute value of the first virtual character based on the current attribute value.

In this step, over the tagging duration during which the virtual tag carried by the first target character is tagged, the virtual tag gradually diminishes from a fresh state, which represents that the current freshness attribute of the virtual tag is negatively correlated to the tag duration during which the virtual tag is tagged. As an example, the virtual tag has 3 freshness attributes, freshness attribute 1: fresh, freshness attribute 2: stale, and freshness attribute 3: dissipating. Assuming that the virtual tag is tagged on the first target character for a duration of 15 sec, the virtual tag is in the fresh state at 0-5 sec, the virtual tag is in a stale state at 6-10 sec, and the virtual tag is in a dissipating state at 11-15 sec.

Corresponding to the above embodiments, the tagging duration during which the virtual tag is tagged is, e.g., 15 sec. When the tagging duration during which the virtual tag is tagged on the first target character and/or the second target character is 0-5 sec, the freshness attribute of the virtual tag is determined to be the freshness attribute 1, which represents that the virtual tag is in the fresh state. When the tagging duration during which the virtual tag is tagged on the first target character and/or the second target character is 6-10 sec, the freshness attribute of the virtual tag is determined to be the freshness attribute 2, which represents that the virtual tag is in the stale state. When the tagging duration during which the virtual tag is tagged on the first target character and/or the second target character is 11-15 sec, the freshness attribute of the virtual tag is determined to be the freshness attribute 3, which represents that the virtual tag is in the dissipating state.

Under different freshness attributes, the attribute value of the virtual tag will change accordingly. Specifically, the attribute value of the virtual tag gradually decreases as the freshness attribute decreases, which represents that the current attribute value is negatively correlated to the current freshness attribute. As an example, the attribute value of the virtual tag is 3 under the freshness attribute 1 (in the fresh state), the attribute value of the virtual tag is 2 under the freshness attribute 2 (in the stale state), and the attribute value of the virtual tag is 1 under the freshness attribute 3 (in the dissipating state).

The current attribute parameter of the virtual tag acquired by the first virtual character is determined based on the current freshness attribute of the virtual tag. Corresponding to the above embodiments, the current attribute value of the virtual tag is 3 when the current freshness attribute of the virtual tag is 1; the current attribute value of the virtual tag is 2 when the current freshness attribute of the virtual tag is 2; and the current attribute value of the virtual tag is 1 when the current freshness attribute of the virtual tag is 3.

On this basis, the virtual attribute value of the first virtual character is updated with the current attribute parameter of the virtual tag.

The virtual attribute value may include game-related parameter values, such as a life value, an attack power value, and an anger value, of the first virtual character. Here, the anger value is a parameter value required by the first virtual character to change its own form. As an example, when the anger value reaches the preset threshold, the first player can trigger change of the form of the first virtual character, so that the first virtual character can obtain better attack effects, thereby reducing the time required to kill other characters by the first virtual character, further accelerating the game process, and shortening the time consumption required for a game.

In an embodiment, the first virtual character includes a first form and a second form, and the controlling, in response to the second touch operation when the virtual attribute value reaches the preset threshold, the first virtual character to perform the corresponding game behavior includes: controlling, in response to the second touch operation when the virtual attribute value reaches the preset threshold, the first virtual character to switch from the current first form to the second form, and configuring the first virtual character with a second character attribute parameter corresponding to the second form.

In this step, when the virtual attribute value of the first virtual character reaches the preset threshold, for example, an attack power of the first virtual character reaches the preset threshold, and the anger value of the first virtual character reaches the preset threshold, the first virtual character is controlled, in response to a third trigger operation exerted by the first player, to change its form, and to change from the current first form to the second form.

Further, after the first virtual character changes to the second form, the first virtual character is configured with a corresponding second character attribute parameter in the second form accordingly.

Here, the first virtual character may have different attack skills in the first form and the second form respectively, to attack an opponent virtual character; or the first virtual character may have same attack skill in the first form and the second form. However, for the same attack skill, the attack effect of using this attack skill in the second form is obviously better than the attack effect of using this attack skill in the first form; and the attack skills in different forms may be set depending on actual situation, which is not limited here.

In the solutions provided in the present disclosure, in response to the second touch operation, the first virtual character is controlled to perform the corresponding game behavior, which may specifically be that, the first player can, when pressing a widget corresponding to the second touch operation, control the first virtual character to perform the corresponding game behavior in the virtual scenario; where the first player can transmit a trigger instruction of the second touch operation through the widget and/or a preset combination key; or a preset combination key in a game controller, such as "L1" key or "R1" key in a game pad. Specifically, the first player can touch a key with his finger, mouse, etc.; or through a preset combination key in a keyboard, for example, a key, such as "ctrl" key, "alt" key, or "a" key in the keyboard. The preset keys may be manually set based on requirements of the first player.

In an embodiment, the method for information processing further includes:

controlling, in response to a third touch operation when the first virtual character is in the first form, the first virtual character to interact in the first form with the second character and/or the non-player virtual character in the virtual scenario in a first interaction mode; where the first interaction mode includes, e.g., a common attack or a skill attack.

In the solutions provided in the present disclosure, in response to the third touch operation, the first virtual character is controlled to interact in the first form with the second virtual character and/or the non-player virtual character in the virtual scenario, which may specifically be that, the first player can, when pressing a widget corresponding to the third touch operation, control the first virtual character to interact in the first form in the virtual scenario with the second virtual character and/or the non-player virtual character in the virtual scenario; where the first player can transmit a trigger instruction of the third touch operation through a key and/or a preset combination key; or a preset combination key in a game controller, such as "L1" key or "R1" key in a game pad. Specifically, the first player can touch a key with his finger, mouse, etc.; or through a preset combination key in a keyboard, for example, a key, such as "ctrl" key, "alt" key, or "a" key in the keyboard. The preset keys may be manually set based on requirements of the first player.

In response to a fourth touch operation when the first virtual character is in the second form, the first virtual character is controlled to interact in the second form with the second character and/or the non-player virtual character in the virtual scenario in a second interaction mode; where the second interaction mode includes, e.g., a common attack or a skill attack.

In the solutions provided in the present disclosure, in response to the fourth touch operation, the first virtual character is controlled to interact in the second form with the second virtual character and/or the non-player virtual character in the virtual scenario, which may specifically be that, the first player can, when pressing a widget corresponding to the fourth touch operation, control the first virtual character to interact in the second form in the virtual scenario with the second virtual character and/or the non-player character in the virtual scenario; where the first player can transmit a trigger instruction of the fourth touch operation through a key and/or a preset combination key; or a preset combination key in a game controller, such as "L1" key or "R1" key in a game pad. Specifically, the first player can touch a key with his finger, mouse, etc.; or through a preset combination key in a keyboard, for example, a key, such as "ctrl" key, "alt" key, or "a" key in the keyboard. The preset keys may be manually set based on requirements of the first player.

Here, an interaction range and a movement velocity of the interaction in the first form of the first virtual character with other virtual characters (including the second virtual character and/or the non-player virtual character) are both smaller than an interaction range and a movement velocity of the interaction in the second form of the first virtual character with other virtual characters (including the second virtual character and/or the non-player virtual character).

Figure 3:
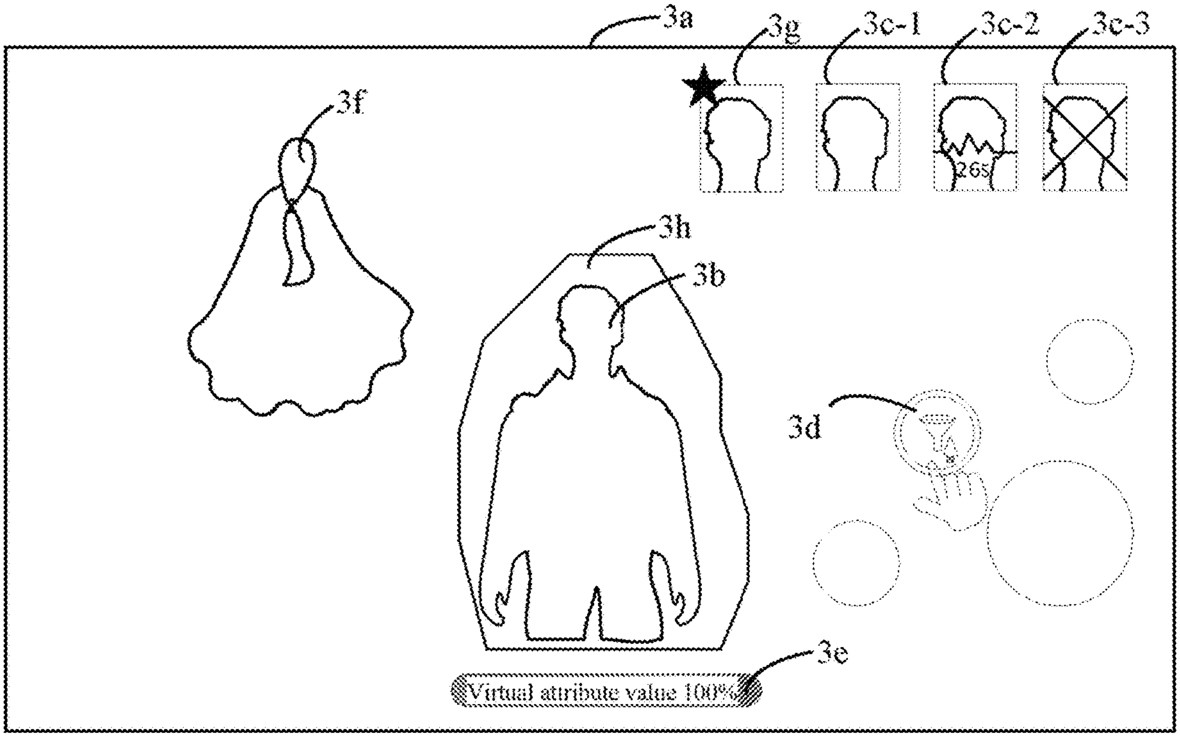
FIG. 3 is a second schematic diagram of a graphical user interface provided in an embodiment of the present disclosure.

Referring to FIG. 3, FIG. 3 is a second schematic diagram of a graphical user interface provided in an embodiment of the present disclosure. As shown in FIG. 3, the graphical user interface 3*a* displays a first virtual character 3*b*, a character identifier 3*c*-1 of a second virtual character to a character identifier 3*c*-3 of the second virtual character, a form switching widget 3*d*, a virtual attribute value status bar 3*e*, a tracked first target character 3*f*, and a character identifier 3*g* of the first target character 3*f*. In response to the second touch operation exerted by the first player on the form switching widget 3*d* when a virtual attribute value in the virtual attribute value status bar 3*e* reaches a preset threshold (for example, when the virtual attribute value reaches 100%), the first virtual character 3*b* is controlled to switch from the first form to the second form 3*h*.

The method for information processing provided in embodiments of the present disclosure determines a first target character from a virtual character set based on a preset tag condition, where the virtual character set includes the at least one second virtual character and the at least one non-player virtual character; tags the first target character with a virtual tag of the first virtual character, controls the virtual tag to be displayed on the graphical user interface of the first virtual character with a first display parameter; adjusts, in response to a first touch operation, the first display parameter to a second display parameter, and controls the virtual tag to be displayed on the graphical user interface of the first virtual character with the second display parameter, where a visibility of the virtual tag displayed on the graphical user interface of the first virtual character with the second display parameter is higher than a visibility of the virtual tag displayed on the graphical user interface of the first virtual character with the first display parameter. In this way, timing for displaying the virtual tag can be controlled, to avoid displaying the virtual tag in an embodiment where display is not needed, thereby further alleviating data processing burden on a terminal device, and reducing response frequency of the terminal device.

Figure 4:
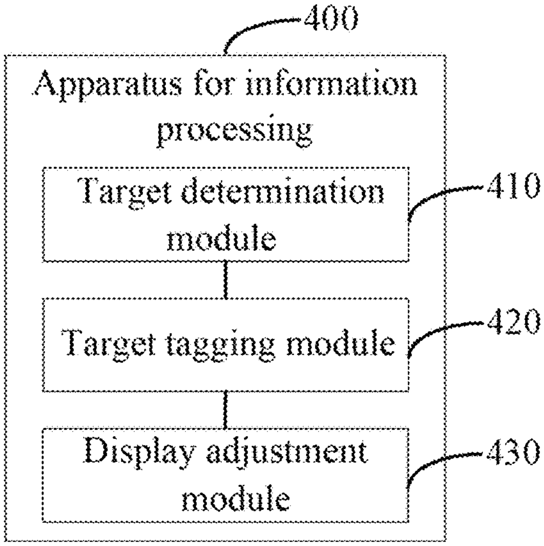
FIG. 4 is a first schematic structural diagram of an apparatus for information processing provided in an embodiment of the present disclosure.
Figure 5:
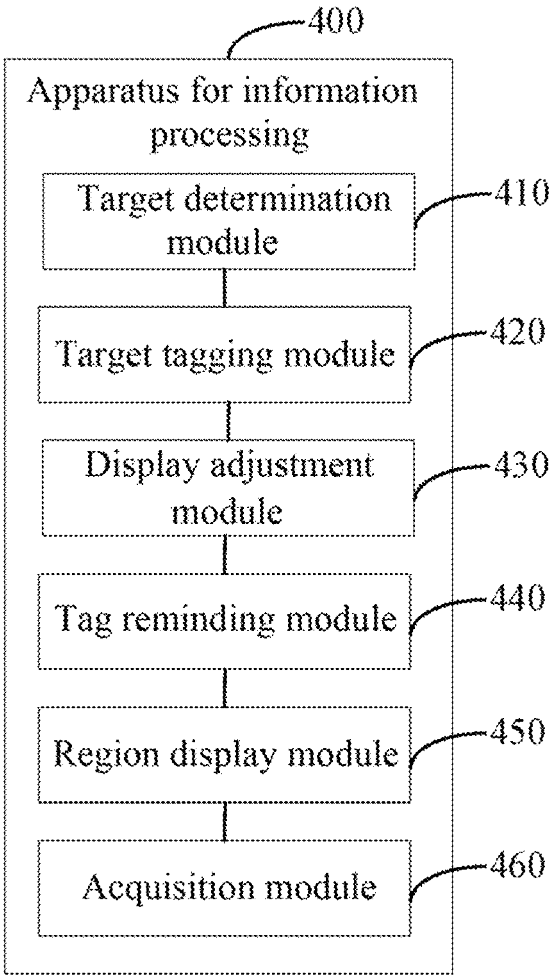
FIG. 5 is a second schematic structural diagram of an apparatus for information processing provided in an embodiment of the present disclosure.

Referring to FIGS. 4 and 5, FIG. 4 is a first schematic structural diagram of an apparatus for information processing provided in an embodiment of the present disclosure; and FIG. 5 is a second schematic structural diagram of an apparatus for information processing provided in an embodiment of the present disclosure. A graphical user interface is provided a through a terminal device, the graphical user interface includes a virtual scenario of a virtual battle, a first virtual character in a first camp, at least one second virtual character in a second camp different from the first camp, and at least one non-player virtual character, where the first virtual character corresponds to the terminal device; and as shown in FIG. 4, the apparatus 400 for information processing includes:

a target determination module 410 configured to determine a first target character from a virtual character set based on a preset tag condition, where the virtual character set includes at least one second virtual character and the at least one non-player virtual character;

a target tagging module 420 configured to tag the first target character with a virtual tag of the first virtual character, and control the virtual tag to be displayed on the graphical user interface of the first virtual character with a first display parameter; and a display adjustment module 430 configured to adjust, in response to a first touch operation, the first display parameter to a second display parameter, and control the virtual tag to be displayed on the graphical user interface of the first virtual character with the second display parameter, where a visibility of the virtual tag displayed on the graphical user interface of the first virtual character with the second display parameter is higher than a visibility of the virtual tag displayed on the graphical user interface of the first virtual character with the first display parameter.

Further, the first target character is configured to tag with the virtual tag a second target character satisfying an interaction condition with the first target character.

Further, when the target determination module 410 is configured to determine the first target character from the virtual character set based on the preset tag condition, the target determination module 410 is configured to:

randomly determine, in response to start of the virtual battle, the first target character from the virtual character set; and/or determine, in response to the start of the virtual battle, the first target character from the virtual character set based on a character type of the second virtual character; and/or determine, in response to the start of the virtual battle, the first target character from the virtual character set based on a relative distance between a spawn position of the second virtual character and a spawn position of the first virtual character; and/or determine, during the virtual battle, a virtual character satisfying a condition for being tagged in the virtual character set as the first target character.

Further, the condition for being tagged includes: a highest game task completion degree in the virtual battle.

Further, as shown in FIG. 5, the graphical user interface includes a character identifier corresponding to the second virtual character, and after the step of the tagging the first target character with the virtual tag of the first virtual character, the apparatus 400 for information processing further includes a tag reminding module 440. The tag reminding module 440 is configured to:

control to display tag information representing that the first target character has been tagged at a character identifier corresponding to the first target character in the second virtual character.

Further, when the display adjustment module 430 is configured to adjust, in response to a first touch operation, the first display parameter to a second display parameter, and control the virtual tag to be displayed on the graphical user interface of the first virtual character with the second display parameter, the display adjustment module 430 is configured to:

control, in response to the first touch operation, the first virtual character to release a first skill, and determine a skill release range and a skill effect duration of the first skill on the graphical user interface of the first virtual character; and adjust, within the skill effect duration, the first display parameter to the second display parameter, and control the virtual tag to be displayed with the second display parameter within the skill release range.

Further, as shown in FIG. 5, a minimap is displayed on the graphical user interface; and the apparatus 400 for information processing further includes a region display module 450. The region display module 450 is configured to:

control a first region and/or a second region in the minimap to be displayed with a third display parameter, while controlling the first virtual character to release the first skill; or control the first region and/or the second region in the minimap to be displayed with a fourth display parameter, while controlling the first virtual character to release the first skill;

where a visibility of the first region and/or the second region displayed in the minimap of the graphical user interface of the first virtual character with the fourth display parameter is higher than a visibility of the first region and/or the second region displayed in the minimap of the graphical user interface of the first virtual character with the third display parameter.

Further, as shown in FIG. 5, the apparatus 400 for information processing further includes an acquisition module 460. The acquisition module 460 is configured to:

control the first virtual character to acquire the virtual tag, and update a virtual attribute value of the first virtual character based on the acquired virtual tag; and control, in response to a second touch operation when the virtual attribute value reaches a preset threshold, the first virtual character to perform a corresponding game behavior.

Further, the first virtual character includes a first form and a second form, and when the acquisition module 460 is configured to control, in response to the second touch operation when the virtual attribute value reaches the preset threshold, the first virtual character to perform the corresponding game behavior, the acquisition module 460 is configured to:

control, in response to the second touch operation when the virtual attribute value reaches the preset threshold, the first virtual character to switch from the current first form to the second form, and configure the first virtual character with a second character attribute parameter corresponding to the second form.

Further, when the acquisition module 460 is configured to update the virtual attribute value of the first virtual character based on the acquired virtual tag, the acquisition module 460 is configured to:

determine a current attribute value of the virtual tag based on a current freshness attribute of the virtual tag; where the current freshness attribute of the virtual tag is negatively correlated to a tagging duration during which the virtual tag is tagged; and the current attribute value is negatively correlated to the current freshness attribute; and update the virtual attribute value of the first virtual character based on the current attribute value.

The apparatus for information processing provided in embodiments of the present disclosure determines a first target character from a virtual character set based on a preset tag condition, where the virtual character set includes the at least one second virtual character and the at least one non-player virtual character; tags the first target character with a virtual tag of the first virtual character, controls the virtual tag to be displayed on the graphical user interface of the first virtual character with a first display parameter; adjusts, in response to a first touch operation, the first display parameter to a second display parameter, and controls the virtual tag to be displayed on the graphical user interface of the first virtual character with the second display parameter, where a visibility of the virtual tag displayed on the graphical user interface of the first virtual character with the second display parameter is higher than a visibility of the virtual tag displayed on the graphical user interface of the first virtual character with the first display parameter. In this way, timing for displaying the virtual tag can be controlled, to avoid displaying the virtual tag in an embodiment where display is not needed, thereby further alleviating data processing burden on a terminal device, and reducing response frequency of the terminal device.

Figure 6:
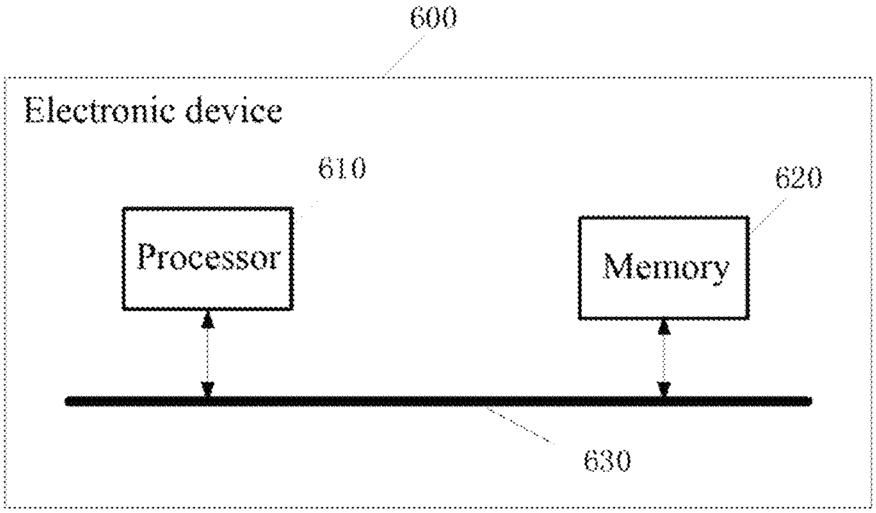
FIG. 6 is a schematic structural diagram of an electronic device provided in an embodiment of the present disclosure.

Referring to FIG. 6, FIG. 6 is a schematic structural diagram of an electronic device provided in an embodiment of the present disclosure. As shown in FIG. 6, the electronic device 600 includes a processor 610, a memory 620, and a bus 630. The memory 620 stores machine-readable instructions executable by the processor 610. When the electronic device runs a control method in the embodiments, the processor 610 communicates with the memory 620 through the bus 630. The processor 610 executes the machine-readable instructions and the preamble part of the method items of the processor 610 to implement the following steps:

determining a first target character from a virtual character set based on a preset tag condition, where the virtual character set includes at least one second virtual character and the at least one non-player virtual character;

tagging the first target character with a virtual tag of the first virtual character, and controlling the virtual tag to be displayed on the graphical user interface of the first virtual character with a first display parameter; and adjusting, in response to a first touch operation, the first display parameter to a second display parameter, and controlling the virtual tag to be displayed on the graphical user interface of the first virtual character with the second display parameter, where a visibility of the virtual tag displayed on the graphical user interface of the first virtual character with the second display parameter is higher than a visibility of the virtual tag displayed on the graphical user interface of the first virtual character with the first display parameter.

In a feasible embodiment, when the processor 610 is configured to determine the first target character from the virtual character set based on the preset tag condition, the processor is specifically configured to:

randomly determine, in response to start of the virtual battle, the first target character from the virtual character set; and/or determine, in response to the start of the virtual battle, the first target character from the virtual character set based on a character type of the second virtual character; and/or determine, in response to the start of the virtual battle, the first target character from the virtual character set based on a relative distance between a spawn position of the second virtual character and a spawn position of the first virtual character; and/or determine, during the virtual battle, a virtual character satisfying a condition for being tagged in the virtual character set as the first target character.

In a feasible embodiment, the condition for being tagged includes: a highest game task completion degree in the virtual battle.

In a feasible embodiment, the graphical user interface includes a character identifier corresponding to the second virtual character, and after the step of the tagging the first target character with the virtual tag of the first virtual character, the processor 610 further implements:

control to display tag information representing that the first target character has been tagged at a character identifier corresponding to the first target character in the second virtual character.

In a feasible embodiment, when the processor 610 is configured to adjust, in response to the first touch operation, the first display parameter to the second display parameter, and control the virtual tag to be displayed on the graphical user interface of the first virtual character with the second display parameter, the processor is specifically configured to:

control, in response to the first touch operation, the first virtual character to release a first skill, and determine a skill release range and a skill effect duration of the first skill on the graphical user interface of the first virtual character; and adjust, within the skill effect duration, the first display parameter to the second display parameter, and control the virtual tag to be displayed with the second display parameter within the skill release range.

In a feasible embodiment, a minimap is displayed on the graphical user interface of the first virtual character; and the processor 610 further implements:

controlling a first region and/or a second region in the minimap to be displayed with a third display parameter, while controlling the first virtual character to release the first skill; or controlling the first region and/or the second region in the minimap to be displayed with a fourth display parameter, while controlling the first virtual character to release the first skill;

where a visibility of the first region and/or the second region displayed in the minimap of the graphical user interface of the first virtual character with the fourth display parameter is higher than a visibility of the first region and/or the second region displayed in the minimap of the graphical user interface of the first virtual character with the third display parameter.

In a possible embodiment, the processor 610 further implements:

controlling the first virtual character to acquire the virtual tag, and updating a virtual attribute value of the first virtual character based on the acquired virtual tag; and controlling, in response to a second touch operation when the virtual attribute value reaches a preset threshold, the first virtual character to perform a corresponding game behavior.

In a feasible embodiment, the first virtual character includes a first form and a second form, and when the processor 610 is configured to control, in response to the second touch operation when the virtual attribute value reaches the preset threshold, the first virtual character to perform the corresponding game behavior, the processor is specifically configured to:

control, in response to the second touch operation when the virtual attribute value reaches the preset threshold, the first virtual character to switch from the current first form to the second form, and configure the first virtual character with a second character attribute parameter corresponding to the second form.

In a feasible embodiment, when the processor 610 is configured to update the virtual attribute value of the first virtual character based on the acquired virtual tag, the processor is specifically configured to:

determine a current attribute value of the virtual tag based on a current freshness attribute of the virtual tag; where the current freshness attribute of the virtual tag is negatively correlated to a tagging duration during which the virtual tag is tagged; and the current attribute value is negatively correlated to the current freshness attribute; and update the virtual attribute value of the first virtual character based on the current attribute value.

According to the above embodiments, a to-be-tagged first target character is determined from a virtual character set including at least one second virtual character and at least one non-player character based on a preset tag condition, the first target character is tagged with a virtual tag of a first virtual character, the virtual tag is displayed on a graphical user interface of the first virtual character based on a first display parameter; in response to a first touch operation, the first display parameter is adjusted to a second display parameter, and the virtual tag is displayed on the graphical user interface of the first virtual character based on a second display parameter; where the virtual tag displayed on the graphical user interface of the first virtual character based on the second display parameter has a higher visibility than the virtual tag displayed on the graphical user interface of the first virtual character based on the first display parameter. In this way, timing for displaying the virtual tag can be controlled, to avoid displaying the virtual tag in an embodiment where display is not needed, thereby further alleviating data processing burden on a terminal device, and reducing response frequency of the terminal device. Moreover, the tagged target character can also be adjusted in real time during the virtual battle in conjunction with actual situation during the virtual battle, so that the tagged target character is more worthy of being tracked by the first virtual character compared to other characters, and then can better assist the first virtual character, thereby further reducing finding the target character by the first virtual character in the virtual battle, and accelerating the game process.

An embodiment of the present disclosure further provides a computer-readable storage medium, storing a computer program thereon, where when the computer program is run by a processor, the processor implements the following steps:

determining a first target character from a virtual character set based on a preset tag condition, where the virtual character set includes at least one second virtual character and the at least one non-player virtual character;

tagging the first target character with a virtual tag of the first virtual character, and controlling the virtual tag to be displayed on the graphical user interface of the first virtual character with a first display parameter; and adjusting, in response to a first touch operation, the first display parameter to a second display parameter, and controlling the virtual tag to be displayed on the graphical user interface of the first virtual character with the second display parameter, where a visibility of the virtual tag displayed on the graphical user interface of the first virtual character with the second display parameter is higher than a visibility of the virtual tag displayed on the graphical user interface of the first virtual character with the first display parameter.

In a feasible embodiment, when the processor is configured to determine the first target character from the virtual character set based on the preset tag condition, the processor is specifically configured to:

randomly determine, in response to start of the virtual battle, the first target character from the virtual character set; and/or determine, in response to the start of the virtual battle, the first target character from the virtual character set based on a character type of the second virtual character; and/or determine, in response to the start of the virtual battle, the first target character from the virtual character set based on a relative distance between a spawn position of the second virtual character and a spawn position of the first virtual character; and/or determine, during the virtual battle, a virtual character satisfying a condition for being tagged in the virtual character set as the first target character.

In a feasible embodiment, the condition for being tagged includes: a highest game task completion degree in the virtual battle.

In a feasible embodiment, the graphical user interface includes a character identifier corresponding to the second virtual character, and after the step of the tagging the first target character with the virtual tag of the first virtual character, the processor further implements:

control to display tag information representing that the first target character has been tagged at a character identifier corresponding to the first target character in the second virtual character.

In a feasible embodiment, when the processor is configured to adjust, in response to the first touch operation, the first display parameter to the second display parameter, and control the virtual tag to be displayed on the graphical user interface of the first virtual character with the second display parameter, the processor is specifically configured to:

control, in response to the first touch operation, the first virtual character to release a first skill, and determine a skill release range and a skill effect duration of the first skill on the graphical user interface of the first virtual character; and adjust, within the skill effect duration, the first display parameter to the second display parameter, and control the virtual tag to be displayed with the second display parameter within the skill release range.

In a feasible embodiment, a minimap is displayed on the graphical user interface of the first virtual character; and the processor further implements:

controlling a first region and/or a second region in the minimap to be displayed with a third display parameter, while controlling the first virtual character to release the first skill; or controlling the first region and/or the second region in the minimap to be displayed with a fourth display parameter, while controlling the first virtual character to release the first skill;

where a visibility of the first region and/or the second region displayed in the minimap of the graphical user interface of the first virtual character with the fourth display parameter is higher than a visibility of the first region and/or the second region displayed in the minimap of the graphical user interface of the first virtual character with the third display parameter.

In a possible embodiment, the processor further implements:

controlling the first virtual character to acquire the virtual tag, and updating a virtual attribute value of the first virtual character based on the acquired virtual tag; and controlling, in response to a second touch operation when the virtual attribute value reaches a preset threshold, the first virtual character to perform a corresponding game behavior.

In a feasible embodiment, the first virtual character includes a first form and a second form, and when the processor is configured to control, in response to the second touch operation when the virtual attribute value reaches the preset threshold, the first virtual character to perform the corresponding game behavior, the processor is specifically configured to:

control, in response to the second touch operation when the virtual attribute value reaches the preset threshold, the first virtual character to switch from the current first form to the second form, and configure the first virtual character with a second character attribute parameter corresponding to the second form.

In a feasible embodiment, when the processor is configured to update the virtual attribute value of the first virtual character based on the acquired virtual tag, the processor is specifically configured to:

determine a current attribute value of the virtual tag based on a current freshness attribute of the virtual tag; where the current freshness attribute of the virtual tag is negatively correlated to a tagging duration during which the virtual tag is tagged; and the current attribute value is negatively correlated to the current freshness attribute; and update the virtual attribute value of the first virtual character based on the current attribute value.

According to the above embodiments, a to-be-tagged first target character is determined from a virtual character set including at least one second virtual character and at least one non-player character based on a preset tag condition, the first target character is tagged with a virtual tag of a first virtual character, the virtual tag is displayed on a graphical user interface of the first virtual character based on a first display parameter; in response to a first touch operation, the first display parameter is adjusted to a second display parameter, and the virtual tag is displayed on the graphical user interface of the first virtual character based on a second display parameter; where the virtual tag displayed on the graphical user interface of the first virtual character based on the second display parameter has a higher visibility than the virtual tag displayed on the graphical user interface of the first virtual character based on the first display parameter. In this way, timing for displaying the virtual tag can be controlled, to avoid displaying the virtual tag in an embodiment where display is not needed, thereby further alleviating data processing burden on a terminal device, and reducing response frequency of the terminal device. Moreover, the tagged target character can also be adjusted in real time during the virtual battle in conjunction with actual situation during the virtual battle, so that the tagged target character is more worthy of being tracked by the first virtual character compared to other characters, and then can better assist the first virtual character, thereby further reducing finding the target character by the first virtual character in the virtual battle, and accelerating the game process.

Those skilled in the art can clearly understand that, for convenience and simplicity of description, corresponding processes in the above method embodiments may be referred to for specific working process of the above-described system, apparatus, and units, which will not be repeated here.

It should be understood that the system, the apparatus, and the method disclosed in the embodiments provided in the present disclosure may be implemented in other ways. The apparatus embodiments described above are merely illustrative. For example, the division of the units is only a logical function division and there may be other manners of division during actual implementations. For another example, a plurality of units or components may be combined or may be integrated into another system, or some features may be omitted or may not be performed. In addition, the illustrated or discussed coupling or direct coupling or communicative connection between each other may be indirect coupling or communicative connection among apparatuses or units through some communication interfaces, and may be electrical connection, mechanical connection, or other forms of connection.

The units described as separate components may or may not be physically separated, the components illustrated as units may or may not be physical units, which represents that these units may be located in a same place or may be distributed to a plurality of network units. A part or all of the units may be selected based on actual requirements to achieve the purpose of the solutions of this embodiment.

In addition, the functional units in various embodiments of the present disclosure may be integrated into one processing unit, or each unit may be physically present alone, or two or more than two units may be integrated into one unit.

The function may be stored in a non-volatile computer-readable storage medium executable by a processor when it is implemented in the form of a software functional unit and is sold or used as a separate product. Based on such understanding, the technical solutions of the present disclosure essentially, or a part of the technical solutions that contribute to the relevant art, or the part of the technical solutions may be embodied in the form of a software product which is stored in a storage medium and includes some instructions for causing a computer device (which may be, e.g., a personal computer, a server, or a network device) to implement all or some of the steps of the method in the embodiments of the present disclosure. The above storage medium includes: various mediums that can store a program code, such as a U disk, a mobile hard disk, a Read-Only Memory (ROM), a Random Access Memory (RAM), a magnetic disk, or an optical disk.

Finally, it should be noted that: the above embodiments are merely specific embodiments of the present disclosure used to illustrate the technical solutions of the present disclosure, instead of imposing any limitation on the present disclosure. The scope of protection of the present disclosure is not limited to the above embodiments. Although the present disclosure has been described in detail with reference to the above embodiments, those with ordinary skills in the art should understand that: any person skilled in the art may still modify or easily conceive of altering the technical solutions disclosed in the above embodiments or equivalently replace a part of the technical features thereof within the technical scope disclosed in the present disclosure. These modifications, alterations, or replacements are not intended to make the essence of corresponding technical solutions depart from the spirit and scope of the technical solutions of the embodiments of the present disclosure, but are all encompassed within the scope of protection of the present disclosure. Therefore, the scope of protection of the present disclosure should be determined by the scope of protection of the claims.

The invention claimed is:

1. A method for information processing, comprising:

determining a first target character from a virtual character set based on a preset tag condition, wherein the virtual character set comprises a second virtual character and a non-player virtual character, and a graphical user interface provided by a terminal device comprises a virtual scenario of a virtual battle, a first virtual character in a first camp, the second virtual character in a second camp different from the first camp, and the non-player virtual character, the first virtual character corresponding to the terminal device;

tagging the first target character with a virtual tag of the first virtual character, and controlling the virtual tag to be displayed on the graphical user interface of the first virtual character with a first display parameter; and adjusting, in response to a first touch operation, the first display parameter to a second display parameter, and controlling the virtual tag to be displayed on the graphical user interface of the first virtual character with the second display parameter, wherein a visibility of the virtual tag displayed on the graphical user interface of the first virtual character with the second display parameter is higher than a visibility of the virtual tag displayed on the graphical user interface of the first virtual character with the first display parameter.

2. The method for information processing according to claim 1, wherein the first target character tags a second target character using the virtual tag of the first virtual character, provided that the second target character satisfies an interaction condition with the first target character.

3. The method for information processing according to claim 1, wherein determining the first target character from the virtual character set based on the preset tag condition comprises at least one of:

determining, in response to a start of the virtual battle, the first target character from the virtual character set randomly;

determining, in response to a start of the virtual battle, the first target character from the virtual character set based on a character type of the second virtual character;

determine, in response to a start of the virtual battle, the first target character from the virtual character set based on a relative distance between a spawn position of the second virtual character and a spawn position of the first virtual character; or determining, during the virtual battle, a virtual character satisfying a condition for being tagged in the virtual character set as the first target character.

4. The method for information processing according to claim 3, wherein the condition for being tagged comprises a highest game task completion degree in the virtual battle.

5. The method for information processing according to claim 1, wherein the graphical user interface comprises a character identifier corresponding to the second virtual character, and after tagging the first target character with the virtual tag of the first virtual character, the method for information processing further comprises:

displaying tag information representing that the first target character has been tagged at the character identifier corresponding to the second virtual character.

6. The method for information processing according to claim 1, wherein adjusting, in response to the first touch operation, the first display parameter to the second display parameter, and controlling the virtual tag to be displayed on the graphical user interface of the first virtual character with the second display parameter comprises:

controlling, in response to the first touch operation, the first virtual character to release a first skill, and determining a skill release range and a skill effect duration of the first skill on the graphical user interface of the first virtual character; and adjusting, within the skill effect duration, the first display parameter to the second display parameter, and controlling the virtual tag to be displayed with the second display parameter within the skill release range.

7. The method for information processing according to claim 6, wherein a minimap is displayed on the graphical user interface of the first virtual character, and the method for information processing further comprises at least one of:

controlling a first region or a second region in the minimap to be displayed with a third display parameter, and controlling the first virtual character to release the first skill; or controlling the first region or the second region in the minimap to be displayed with a fourth display parameter, and controlling the first virtual character to release the first skill, wherein a visibility of the first region or the second region displayed in the minimap of the graphical user interface of the first virtual character with the fourth display parameter is higher than a visibility of the first region or the second region displayed in the minimap of the graphical user interface of the first virtual character with the third display parameter.

8. The method for information processing according to claim 1, wherein the method for information processing further comprises:

controlling the first virtual character to acquire the virtual tag, and updating a virtual attribute value of the first virtual character based on the acquired virtual tag; and controlling, in response to a second touch operation when the virtual attribute value reaches a preset threshold, the first virtual character to perform a corresponding game behavior.

9. The method for information processing according to claim 8, wherein the first virtual character comprises a first form and a second form, and controlling, in response to the second touch operation when the virtual attribute value reaches the preset threshold, the first virtual character to perform the corresponding game behavior comprises:

controlling, in response to the second touch operation when the virtual attribute value reaches the preset threshold, the first virtual character to switch from the first form to the second form, and configuring the first virtual character with a second character attribute parameter corresponding to the second form.

10. The method for information processing according to claim 8, wherein updating the virtual attribute value of the first virtual character based on the acquired virtual tag comprises:

determining an attribute value of the virtual tag based on a freshness attribute of the virtual tag, wherein the freshness attribute of the virtual tag is negatively correlated to a tagging duration during which the virtual tag is tagged, and the attribute value is negatively correlated to the freshness attribute; and updating the virtual attribute value of the first virtual character based on the attribute value.

11. A system, comprising:

one or more memories collectively containing one or more programs; and one or more processors, wherein the one or more processors are configured to, individually or collectively, perform an operation comprising:

determining a first target character from a virtual character set based on a preset tag condition, wherein the virtual character set comprises a second virtual character and a non-player virtual character, and a graphical user interface provided by a terminal device comprises a virtual scenario of a virtual battle, a first virtual character in a first camp, the second virtual character in a second camp different from the first camp, and the non-player virtual character, the first virtual character corresponding to the terminal device;

tagging the first target character with a virtual tag of the first virtual character, and controlling the virtual tag to be displayed on the graphical user interface of the first virtual character with a first display parameter; and adjusting, in response to a first touch operation, the first display parameter to a second display parameter, and controlling the virtual tag to be displayed on the graphical user interface of the first virtual character with the second display parameter, wherein a visibility of the virtual tag displayed on the graphical user interface of the first virtual character with the second display parameter is higher than a visibility of the virtual tag displayed on the graphical user interface of the first virtual character with the first display parameter.

12. One or more non-transitory computer-readable storage media containing, in any combination, computer program code that, when executable by a computer system, perform an operation comprising:

determining a first target character from a virtual character set based on a preset tag condition, wherein the virtual character set comprises a second virtual character and a non-player virtual character, and a graphical user interface provided by a terminal device comprises a virtual scenario of a virtual battle, a first virtual character in a first camp, the second virtual character in a second camp different from the first camp, and the non-player virtual character, the first virtual character corresponding to the terminal device;

tagging the first target character with a virtual tag of the first virtual character, and controlling the virtual tag to be displayed on the graphical user interface of the first virtual character with a first display parameter; and adjusting, in response to a first touch operation, the first display parameter to a second display parameter, and controlling the virtual tag to be displayed on the graphical user interface of the first virtual character with the second display parameter, wherein a visibility of the virtual tag displayed on the graphical user interface of the first virtual character with the second display parameter is higher than a visibility of the virtual tag displayed on the graphical user interface of the first virtual character with the first display parameter.

13. The one or more non-transitory computer-readable storage media of claim 12, wherein the first target character tags a second target character using the virtual tag of the first virtual character, provided that the second target character satisfies an interaction condition with the first target character.

14. The one or more non-transitory computer-readable storage media of claim 12, wherein determining the first target character from the virtual character set based on the preset tag condition comprises at least one of:

determining, in response to a start of the virtual battle, the first target character from the virtual character set randomly;

determining, in response to a start of the virtual battle, the first target character from the virtual character set based on a character type of the second virtual character;

determine, in response to a start of the virtual battle, the first target character from the virtual character set based on a relative distance between a spawn position of the second virtual character and a spawn position of the first virtual character; or determining, during the virtual battle, a virtual character satisfying a condition for being tagged in the virtual character set as the first target character.

15. The one or more non-transitory computer-readable storage media of claim 12, wherein the graphical user interface comprises a character identifier corresponding to the second virtual character, and after tagging the first target character with the virtual tag of the first virtual character, the operation further comprises:

displaying tag information representing that the first target character has been tagged at the character identifier corresponding to the second virtual character.

16. The one or more non-transitory computer-readable storage media of claim 12, wherein adjusting, in response to the first touch operation, the first display parameter to the second display parameter, and controlling the virtual tag to be displayed on the graphical user interface of the first virtual character with the second display parameter comprises:

controlling, in response to the first touch operation, the first virtual character to release a first skill, and determining a skill release range and a skill effect duration of the first skill on the graphical user interface of the first virtual character; and adjusting, within the skill effect duration, the first display parameter to the second display parameter, and controlling the virtual tag to be displayed with the second display parameter within the skill release range.

17. The one or more non-transitory computer-readable storage media of claim 16, wherein a minimap is displayed on the graphical user interface of the first virtual character, and the operation further comprises at least one of:

controlling a first region or a second region in the minimap to be displayed with a third display parameter, and controlling the first virtual character to release the first skill; or controlling the first region or the second region in the minimap to be displayed with a fourth display parameter, and controlling the first virtual character to release the first skill, wherein a visibility of the first region or the second region displayed in the minimap of the graphical user interface of the first virtual character with the fourth display parameter is higher than a visibility of the first region or the second region displayed in the minimap of the graphical user interface of the first virtual character with the third display parameter.

18. The one or more non-transitory computer-readable storage media of claim 12, wherein the operation further comprises:

controlling the first virtual character to acquire the virtual tag, and updating a virtual attribute value of the first virtual character based on the acquired virtual tag; and controlling, in response to a second touch operation when the virtual attribute value reaches a preset threshold, the first virtual character to perform a corresponding game behavior.

19. The one or more non-transitory computer-readable storage media of claim 18, wherein the first virtual character comprises a first form and a second form, and controlling, in response to the second touch operation when the virtual attribute value reaches the preset threshold, the first virtual character to perform the corresponding game behavior comprises:

controlling, in response to the second touch operation when the virtual attribute value reaches the preset threshold, the first virtual character to switch from the first form to the second form, and configuring the first virtual character with a second character attribute parameter corresponding to the second form.

20. The one or more non-transitory computer-readable storage media of claim 18, wherein updating the virtual attribute value of the first virtual character based on the acquired virtual tag comprises:

determining an attribute value of the virtual tag based on a freshness attribute of the virtual tag, wherein the freshness attribute of the virtual tag is negatively correlated to a tagging duration during which the virtual tag is tagged, and the attribute value is negatively correlated to the freshness attribute; and updating the virtual attribute value of the first virtual character based on the attribute value.

* * * * *